United States Patent [19]

Dowbenko et al.

[11] 3,897,295
[45] July 29, 1975

[54] IONIZING RADIATION METHOD FOR FORMING ACRYLIC PRESSURE SENSITIVE ADHESIVES AND COATED SUBSTRATES

[75] Inventors: Rostyslaw Dowbenko; Roger M. Christenson, both of Gibsonia, Pa.

[73] Assignee: PPG Industries, Inc., Pittsburgh, Pa.

[22] Filed: June 2, 1972

[21] Appl. No.: 259,318

Related U.S. Application Data

[63] Continuation-in-part of Ser. No. 791,764, Jan. 16, 1969, abandoned.

[52] U.S. Cl. ........ 156/272; 117/93.31; 117/122 PA; 117/155 UA; 156/308; 156/327; 204/159.15; 204/159.16; 260/875; 260/885; 156/230; 117/3.4
[51] Int. Cl. ...... C09j 7/04; B29c 27/14; B44d 1/50
[58] Field of Search.................. 117/122 PA, 93.31; 204/159.16, 159.15; 260/885; 156/272, 308, 327, 230; 264/22

[56] References Cited
UNITED STATES PATENTS

| | | | |
|---|---|---|---|
| 2,525,664 | 10/1950 | Gadsby et al. | 204/159.23 X |
| 2,544,692 | 3/1951 | Kugler et al. | 117/122 PA |
| 2,575,585 | 11/1951 | Cox et al. | 117/122 PA |
| 2,921,006 | 1/1960 | Schmitz et al. | 204/159.22 X |
| 3,087,850 | 4/1963 | Cole | 117/122 PA X |
| 3,087,875 | 4/1963 | Graham et al. | 204/159.16 |
| 3,502,745 | 3/1970 | Minton | 260/885 |
| 3,535,293 | 10/1970 | Anderson | 117/122 PA X |
| 3,557,063 | 1/1971 | D'Alelio | 117/122 PA X |
| 3,616,364 | 10/1971 | D'Alelio | 204/159.16 X |
| 3,645,984 | 2/1972 | Dowbenko et al. | 204/159.16 X |
| 3,670,048 | 6/1972 | Magat et al. | 117/93.31 X |
| 3,733,292 | 5/1973 | Sirota et al. | 117/122 PA X |
| 3,770,602 | 11/1973 | D'Alelio | 117/93.31 |

*Primary Examiner*—Charles E. Van Horn
*Assistant Examiner*—Thomas E. Bokan
*Attorney, Agent, or Firm*—Carl T. Severini

[57] ABSTRACT

Pressure-sensitive adhesives having improved adhesive properties are formed by subjecting a mixture comprising a monomer selected from the group consisting of alkyl acrylates, hydroxyalkyl acrylates, alkoxyalkyl acrylates, cyanoalkyl acrylates, alkyl methacrylates, hydroxyalkyl methacrylates, alkoxyalkyl methacrylates, cyanoalkyl methacrylates, N-alkoxymethylacrylamides, and N-alkoxymethylmethacrylamides, and a homopolymer or copolymer selected from the group consisting of polymers of alkyl acrylates, hydroxyalkyl acrylates, alkoxyalkyl acrylates, cyanoalkyl acrylates, alkyl methacrylates, hydroxyalkyl methacrylates, alkoxyalkyl methacrylates, cyanoalkyl methacrylates, acrylamide, methacrylamide, N-(substituted alkyl) acrylamides, N-(substituted alkyl)methacrylamides, alkyl acrylamides, alkyl methacrylamides, and N-alkoxymethylacrylamides and N-alkoxymethylmethacrylamides to ionizing irradiation. The adhesive material finds utility as binding resins in laminates, coatings on substrates, and as film adhesives.

12 Claims, No Drawings

IONIZING RADIATION METHOD FOR FORMING ACRYLIC PRESSURE SENSITIVE ADHESIVES AND COATED SUBSTRATES

CROSS REFERENCE TO RELATED APPLICATIONS

This application is a continuation-in-part of application Ser. No. 791,764, filed Jan. 16, 1969 now abandoned.

As is known in the art, pressure-sensitive adhesives comprise a class of adhesive compositions which may be formulated from a variety of materials such as gums and resins of both natural and synthetic derivation. When coated on a suitable substrate, these adhesive compositions share the common characteristic of being agressively and more or less permanently tacky at room temperature and are thus able to adhere to surfaces by the application of nothing more than manual pressure. Adhesives of this type may be applied to various substrates such as paper, cloth and plastic films and the resulting coated substrates may then be converted to tapes and labels which are especially useful in the packaging field for any number of applications involving marking, sealing, reinforcing or banding.

The forming of pressure-sensitive adhesives by polymerizing monomers or mixtures of monomers is well known in the art. The monomers employed often include functional monomers which give the resulting adhesives greater strength. In producing adhesives by such methods, the monomers are put into a solution along with a free-radical initiator and heated at an elevated temperature to polymerize the monomers. The product is utilized by applying a layer of the polymer solution on to a substrate whereupon the solvent evaporates to form the adhesive film.

The above method of forming pressure-sensitive adhesives, however, involves considerable expense. Because the resultant polymer is of extremely high molecular weight, thus resulting in a high viscous solution, the polymer solution used to apply the pressure-sensitive adhesive must be maintained at a rather low non-volatile solids content, which is conventionally about 25–35 percent solids. The solvents used are quite expensive and cannot be economically recovered after the adhesive solution is dried. Among other problems inherent in the prior art method of forming pressure-sensitive adhesives is that a great many of the solvents used are highly inflammable and explosive, and extra care must be exercised when using them.

It has now been discovered that pressure-sensitive adhesives having greater tack and adhesive strength are obtained using a method which eliminates the use of non-recoverable solvents and expensive manufacturing and application processes. In this method, a monomeric alkyl acrylate, hydroxyalkyl acrylate, alkoxyalkyl acrylate, cyanoalkyl acrylate, alkyl methacrylate, hydroxyalkyl methacrylate, alkoxyalkyl methacrylate, cyanoalkyl methacrylate, N-alkoxymethylacrylamide or N-alkoxymethylmethacrylamide is mixed with a homopolymer of alkyl acrylate, hydroxyalkyl acrylate, alkoxyalkyl acrylate, cyanoalkyl acrylate, alkyl methacrylate, hydroxyalkyl methacrylate, cyanoalkyl methacrylate, acrylamide, methacrylamide, N-alkoxymethylacrylamide, N-(substituted alkyl)acrylamide, N-(substituted alkyl)methacrylamide, alkyl acrylamide, alkyl methacrylamide or N-alkoxymethylmethacrylamide, or a copolymer of any of alkyl acrylate, hydroxyalkyl acrylate, alkoxyalkyl acrylate, cyanoalkyl acrylate, alkyl methacrylate, hydroxyalkyl methacrylate, cyanoalkyl methacrylate, acrylamide, methacrylamide, N-alkoxymethylacrylamide and N-(substituted alkyl)acrylamide, N-(substituted alkyl)methacrylamide, alkyl acrylamide, alkyl methacrylamide and N-alkoxymethylmethacrylamide, to form an essentially solventless composition and subjected to ionizing irradiation to form the pressure-sensitive adhesive material. Using this process, no solvents need be used as the process may be carried out at 100 percent solids. Surprisingly, the resulting polymer has greatly improved tack and adhesive strength over the conventional solution polymerized polymers.

It is pointed out that although it is, of course, preferable that the composition contain no non-reacting solvents to avoid pollution and expense, some solvent may be present. Thus, while solvent solutions generally contain an appreciable amount of solvent the compositions of this invention may contain up to about 20% by weight of such solvents.

It is not fully known why the adhesives which are produced in the above manner by ionizing irradiation are superior in adhesive properties to the adhesives formed by the prior art methods. It is believed, however, that the difference is at least partly due to the high degree of cross-linking taking place in the polymer chain due to the ionizing irradiation whereas the prior art polymers are, for the most part, linear and crosslink only to a moderate degree, if at all, during heating to remove solvents.

The monomers intended in this invention are acrylic esters such as alkyl acrylates, hydroxyalkyl acrylates, alkoxyalkyl acrylates, prior acrylates, methacrylates, hydroxyalkyl methacrylates, alkoxyalkyl methacrylates, cyanoalkyl methacrylates, and acrylic amides such as N-alkoxymethylacrylamides radiation" and N-alkoxymethylmethacrylamides. The alkyl acrylates and methacrylates used in this invention generally have the formula

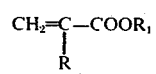

$$CH_2=C-COOR_1$$
$$|$$
$$R$$

where R is selected from the group consisting of H and $CH_3$ radicals and $R_1$ is an alkyl radical preferably containing from one to 18 carbon atoms. The alkyl radical $R_1$ may be a branched or straight chain radical. Examples of these monomers are ethyl acrylate, butyl acrylate, 2-ethylhexyl acrylate, lauryl acrylate, lauryl methacrylate, amyl acrylate, amyl methacrylate, n-octyl methacrylate, isooctyl acrylate, isodecyl acrylate, isooctyl methacrylate, 2,4,4-trimethyl-2-pentyl acrylate, and the like. Examples of hydroxyalkyl acrylates and methacrylates are hydroxy methyl methacrylate, hydroxy ethyl acrylate, hydroxy butyl acrylate, and the like. Examples of alkoxy alkyl acrylates and methacrylates are methoxy butyl acrylate, ethoxy propyl methacrylate, and the like. Examples of cyanoalkyl acrylates and methacrylates are cyanoethyl acrylate, cyanopropyl methacrylate, and the like. Examples of N-alkoxymethylacrylamides and N-alkoxymethylmethacrylamides are N-(2-ethylhexoxymethyl)-acrylamide, N-(2-ethylhexoxmethyl)methacrylamide, N-butoxymethylacrylamide, N-butoxymethacrylamide, N-octoxymethyl-acrylamide N-octoxymethacrylamide, N-lauryloxymethylacrylamide, N-lauryloxymethacrylamide, and the like.

The process of this invention is carried out by mixing any of the above monomers or combinations of the above monomers with homopolymers of the same alkyl acrylates, hydroxyalkyl acrylates, alkoxyalkyl acrylates, cyanoalkyl acrylates, alkyl methacrylates, hydroxyalkyl methacrylates, alkoxyalkyl methacrylates, cyanoalkyl methacrylates, and acrylic amides, as above described or with homopolymers of other acrylic amides such as those of acrylamide or methacrylamide or N-(substituted alkyl)acrylamides and methacrylamide or unsubstituted alkyl acrylamides and methacrylamides, or copolymers of the alkyl acrylates, hydroxyalkyl acrylates, alkoxyalkyl acrylates, cyanoalkyl acrylates, alkyl methacrylates, hydroxyalkyl methacrylates, alkoxyalkyl methacrylates, cyanoalkyl methacrylates, and acrylic amides. Examples of N-(substituted alkyl)acrylamides are N-hydroxyethylacrylamide, hydroxybutylmethacrylamide, diacetone acrylamide and the like, and examples of unsubstituted alkyl acrylamides and methacrylamides are N-octyl acrylamide, N-isoctyl methacrylamide, N-tert-butylacrylamide N-isopropylmethacrylamide, and the like. The mixture generally contains from about 30 percent to about 98 percent by weight of the monomers and from about 2 percent to about 70 percent by weight of the polymer or copolymer. Preferably, however, the mixture contains a major amount of monomer.

The novel compositions may be formed by precipitating the polymer out of the solution of the polymer in a suitable solvent such as methanol and drying the polymer and dissolving the polymer in the monomer. The solvent used for the homopolymer or copolymer may be any solvent compatible with polymers of alkyl acrylates, hydroxyalkyl acrylates, alkoxyalkyl acrylates, cyanoalkyl acrylates, alkyl methacrylates, hydroxyalkyl methacrylates, alkoxyalkyl methacrylates, cyanoalkyl methacrylates, acrylamide, methacrylamide, N-alkoxymethylacrylamides and N-alkoxymethylmethacrylamides, such as ethyl acetate, methyl ethyl ketone, hexane, cyclohexane, benzene, toluene, and the like.

At this time it may be desirable to add functional monomers which are compatible with the above-described monomer-polymer mixtures to increase the strength and tack properties of the final pressure-sensitive adhesives. These monomers may be ethylenically unsaturated monomers containing reactive functional groups such as diethylene glycol diacrylate, acrylic acid, diacetone acrylamide, 2-acryloxyethyl hydrogen maleate, 2-acryloxyethyl hydrogen phthalate, 2-acryloxyethyl hydrogen succinate, 2-methacryloxyethyl hydrogen maleate, 2-cyanoethyl hydrogen maleate, 2-acryloxyethyl hydrogen chlorendate, N-t-butylacrylamide, N-(2,4,4-trimethyl-2-pentyl)acrylamide, ethyl hydrogen maleate, ethyl hydrogen fumarate, and the like.

Especially desirable are the adhesives formed with functional monomers selected from the group consisting of dialkyl maleates, dialkyl fumarates, hydroxyalkyl maleates, hydroxyalkyl fumarates, cyanoalkyl maleates, cyanoalkyl fumarates, alkyl hydrogen maleates, alkyl hydrogen fumarates, cyanoalkyl hydrogen maleates, cyanoalkyl hydrogen fumarates, N-t-butylacrylamide, and diacetone acrylamide. The polymer-monomer mixture may contain from 0 percent to about 30 percent of these functional monomers based on the total amount of monomers in the mixture. Preferably the mixture contains from about 2 percent to about 30 percent of the functional monomers.

Any one or combination of two or more of the above functional monomers may be included in the mixture of monomers.

It is often desirable to add small amounts of a thickening agent to increase the viscosity of the monomer-polymer mixture and to facilitate the application of the monomer-polymer mixture to a substrate. The preferred thicknening agents are relatively high molecular weight polymeric materials, which in many cases also improve the adhesive properties of the final pressure-sensitive adhesive. By "high molecular weight" is meant molecular weights which are greater than about 20,000. When present, the polymeric thickening agent generally comprise up to about 30 percent by weight of the mixture to be subjected to the ionizing irradiation but are preferably present in an amount of from about 3 to about 30 percent by weight of the mixture. Examples of these thickening agents are neoprene rubbers, butyl rubbers, styrene-butadiene rubbers, nitrile rubbers, poly(ethylene), poly(propylene), copolymers of ethylene and vinyl esters or ethers, poly(alkyl acrylates), poly(alkyl methacrylates), polyesters such as poly(ethylene maleate), poly(propylene fumarate), poly(propylene phthalate), and the like.

Other types of thickening agents may also be used to good advantage. These include finely-divided silica, alumina and the like.

It is noted that in many cases the polymeric thickening agents when added to the mixture of monomers and subjected to irradiation are believed to form graft copolymers with the polymerizable monomers and polymers of the mixture. It has not been heretofore possible to achieve these results by conventional means as these polymers gel in the mixture of monomers while they are being polymerized in solution and the polymers are not compatible with the polymerized monomers. Using the prior art methods of polymerizing the monomers to form pressure-sensitive adhesives, the polymeric thickening agents would separate from the polymerized monomers.

It is generally desirable to polymerize the mixture on the substrate to be bonded. For instance, if it is desired to bond a substrate such as aluminum to another material, the mixture of monomers and polymers is applied to the aluminum and subjected to ionizing irradiation to form a layer of pressure-sensitive adhesive adherently bonded to the aluminum. Alternatively, the mixture of monomers and polymers may be polymerized by irradiation on release paper and transferred after irradiation to the substrate desired, or the pressure-sensitive adhesive may be formed into a film for further use by merely irradiating the mixture onto a release sheet and transferring the film from the release sheet. The adhesive also finds great utility as a binding resin for laminates wherein a material is coated with the mixture of monomers and polymers, subjected to ionizing irradiation and then pressed to another material to form a bonded material. Preferably, the cured film has a thickness of from about 1 to about 25 mils.

The particular method used to coat the substrate is not critiial as any conventional coating technique may be used. For instance, spraying, roller coating, curtain coating, and many other well known methods may be used. Using the mixture of monomers and polymers of the present invention, it is preferable to apply the coating using a roller coater to achieve thin uniform coatings.

The term "irradiation," as used herein, means high energy radiation and/or the secondary energies resulting from conversion of this electron or other particle energy to neutron or gamma radiation, said energies being at least equivalent to about 100,000 electron volts. While various types of irradiation are suitable for this purpose, such as X-ray and gamma and beta rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20 million electron volts. Generally, the higher the electron energy used, the greater is the depth of penetration into the massive structure of the materials to be treated, and the shorter is the time of exposure required to accomplish the deisred result. For other types of radiation, such as gamma and X-rays, energy systems equivalent to the above range of electron volts are desirable.

It is intened that the term "irradiation" include what has been referred to in the rior art as "ionizing radiation" which has been defined as radiation possessing an energy at least sufficient to produce ions or to break chemical bonds and thus includes also radiations such as "ionizing particle raidation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type traveling wave accelerator, model Mark I, operating at 3 to 10 million electron volts, such as supplied by High Voltage Engineering Corporation, Burlington, Massachusetts, or other types of accelerators as described in U.S. Pat. No. 2,763,609 and in British Pat. specification No. 762,953 are satisfactory for the practice of this invention.

The monomers described herein will cure acceptably using any total dosage between about 2 megarads and about 20 megarads. A "rad" is defined as that amount of radiation required to supply 100 ergs per gram of material being treated and a megarad is $10^6$ rads. The total dosage is the total amount of irradiation received by the coating or film. The rate of irradiation is generally not believed to be important as the total dosage is believed to be the predominant factor in the curing of the mixtures.

The process of this invention is best carried out by combining the mixtures of monomers and polymers with a thickener such as neoprene and applying a layer of from about 1 mil to about 25 mils thickness over a substrate and passing the coated substrate under electron beam irradiation at a certain line speed for a designated time. The particular speed and time is not critical so long as the coated substrate is exposed to the irradiation for a time long enough to acquire a total dose of about 2 to about 20 megarads. The line speed used may be varied according to apparatus limitations. However, it is desirable that the line speed be slow enough so that the mixture will not flow off the substrate during curing. It is noted that at a total dosage of less than about 2 megarads there is generally insufficient polymerization of the monomers and at a total dosage exceeding about 20 megarads there is generally some waste of energy. The preferred range for total dosage is between about 6 megarads and 10 megarads. The irradiation is preferably carried out in an inert atmosphere, such as nitrogen gas.

The pressure-sensitive products of this invention are useful as pressure-sensitive adhesive coatings on many substrates, including aluminum foil, steel or other metal panels; asbestos sheets, plastic substrates, such as polyvinyl chloride, Mylar and the like; cellulosic substrates such as paper, wood, etc.; fabrics such as cotton, nylon, wool and the like. Especially useful are products such as adhesive tapes and the like wherein the adhesive is formed on a thin, flexible backing sheet material. These products may also be used as laminating binders and as supported or unsupported film adhesives. For all these uses and many others not described, the resulting product has exceptional adhesive properties.

The following examples set forth specific embodiments of the instant invention. However, the invention is not to be construed as being limited to these embodiments for there are, of course, numerous possible variations and modifications. All parts and percentages in the examples as well as throughout the specification are by weight unless otherwise indicated.

EXAMPLE 1

A pressure-sensitive adhesive was prepared by precipitating with methanol 2.4 grams of poly(2-ethylhexyl acrylate) out of a 12.1 percent solution of poly(2-ethylhexyl acrylate) and drying the polymer and dissolving it in 5 grams of N-2-ethylhexoxymethylacrylamide monomer.

A layer of 3 mil thickness of the mixture of monomer and polymer was coated onto a vinyl sheet and subjected to electron beam impingement at a rate of 22 feet per minute at an accelerating potential of 375 KV and a tube current of 14 ma. The total dosage given the coating was 4.4 megarads and the resulting product was a completely cured and tacky pressure-sensitive adhesive.

This pressure-sensitive adhesive was compared to pressure-sensitive adhesives formed by polymerizing only monomers of ethylhexyl acrylate and N-(2-ethylhexoxymethyl)-acrylamide. Under the same ionizing irradiation conditions, the latter two products were found to be either too soft or too hard to be utilized as pressure-sensitive adhesives and both polymers were insufficiently tacky to be useful for most adhesive purposes.

EXAMPLES 2 to 18

A series of pressure-sensitive adhesives were prepared from the following mixtures:

| Example | Monomer | Amount (grams) | Polymer | Amount (grams) |
|---|---|---|---|---|
| 2 | 2-ethylhexyl acrylate | 10 | 2-ethylhexyl acrylate | 2.4 |
| 3 | 3-methoxybutyl acrylate | 5 | 2-ethylhexyl acrylate | 2.4 |
|   | 2-ethylhexyl acrylate | 5 | | |
| 4 | N-(2-ethylhexoxymethyl)-acrylamide | 5 | 2-ethylhexyl acrylate | 2.4 |
|   | 2-ethylhexyl acrylate | 5 | | |
| 5 | N-(2-ethylhexoxymethyl)-acrylamide | 5 | N-(2-ethylhexoxymethyl)-acrylamide | 2.5 |
| 6 | 2-ethylhexyl acrylate | 5 | N-(2-ethylhexoxymethyl)-acrylamide | 2.5 |
| 7 | 3-methoxybutyl acrylate | 5 | N-(2-ethylhexoxymethyl)-acrylamide | 2.5 |
| 8 | 2-ethylhexyl acrylate | 5 | 2-ethylhexyl acrylate | 1.25 |
|   |   |   | N-(2-ethylhexoxymethyl)-acrylamide | 1.25 |
| 9 | N-(2-ethylhexoxymethyl)-acrylamide | 5 | 2-ethylhexyl acrylate | 1.25 |
|   |   |   | N-(2-ethylhexoxymethyl)-acrylamide | 1.25 |
| 10 | 3-methoxybutyl acrylate | 5 | 2-ethylhexyl acrylate | 1.25 |
|   |   |   | N-(2-ethylhexoxymethyl)-acrylamide | 1.25 |
| 11 | 2-ethylhexyl acrylate | 5 | 2-ethylhexyl acrylate | 1.25 |
|   |   |   | N-isooctylacrylamide | 1.25 |
| 12 | N-(2-ethylhexoxymethyl)-acrylamide | 5 | 2-ethylhexyl acrylate | 1.25 |
|   |   |   | N-isooctylacrylamide | 1.25 |
| 13 | 2-ethylhexyl acrylate | 5 | N-isooctylacrylamide | 2.5 |
|   |   |   | 2-ethylhexyl acrylate | 2.5 |
| 14 | 2-ethylhexyl acrylate | 5 | 2-ethylhexyl acrylate | 2 |
|   |   |   | N-isooctylacrylamide | 2 |
| 15 | 2-ethylhexyl acrylate | 5 | 2-ethylhexyl acrylate | 1.25 |
|   |   |   | N-isooctylacrylamide | 3.75 |
| 16 | 2-ethylhexyl acrylate | 5 | 2-ethylhexyl acrylate | 1.25 |
|   |   |   | N-isooctylacrylamide | 2.50 |
| 17 | 2-ethylhexyl acrylate | 5 | 2-ethylhexyl acrylate | 1.25 |
|   |   |   | N-isooctylacrylamide | 1.25 |
| 18 | N-(2-ethylhexoxymethyl)-acrylamide | 5 | N-(2-ethylhexoxymethyl)-acrylamide | 2.5 |

The above mixtures were coated on vinyl substrates and subjected to electron beam impingement in an atmosphere of nitrogen gas at a line speed of 30 feet per minute at an accelerating potential of 365 KV and a tube current of 6 ma. The samples were polymerized under total dosages ranging from 2.15 megarads to 6.5 megarads and the resultant products were tacky and had excellent pressure-sensitive adhesive properties.

It is noted that adhesives having good properties may also be made using many other alkyl acrylates, hydroxyalkyl acrylates, alkoxyalkyl acrylates, cyanoalkyl acrylates, alkyl methacrylates, hydroxyalkyl methacrylates, alkoxyalkyl methacrylates, cyanoalkyl methacrylates, N-alkoxymethylacrylamides and N-alkoxymethylmethacrylamides and the corresponding polymers. It is further noted that the mixture to be irradiated may include any conventional adhesive monomer or polymers and any conventional thickening agent.

The polymerization of these mixtures by ionizing irradiation provides many advantages over the solution polymerization of these mixtures besides the advantage of having improved adhesive properties. The most notable added advantage of polymerizing by ionizing irradiation lies in the fact that the mixtures may be cured at extremely high rates of speed because of the low dosages that these unique mixtures require and the high dosage rates available. The mixtures and substrates coated with the mixtures may be cured at rates of 1,000 feet per minute and faster. (Speeds such as 1,000 feet per minute and more would not be practical using any other curing method.) Another advantage of irradiation curing of these mixtures is that many substrates such as wood, plywood, plastics, textiles, and metals, which are heat-sensitive may be coated with these mixtures and cured by ionizing irradiation without using high tempertures. The irradiation cure of these materials may be carried out at room temperature. (Other advantages are that the irradiation equipment requires less space than do the ovens required for the elimination of solvents which could pose air pollution problems.)

According to the provisions of the patent statutes, there is described above the invention and what are now considered to be its best embodiments. However, within the scope of the appended claims, it is to be understood that the invention can be practiced otherwise than specifically described.

I claim:

1. The method of forming a pressure-sensitive adhesive which comprises applying to a release paper a layer of an essentially solventless syrup of from about 50 percent to about 98 percent by weight of
    1. a monomer selected from the class consisting of alkyl acrylates, hydroxyalkyl acrylates, alkoxyalkyl acrylates, cyanoalkyl acrylates, alkyl methacrylates, hydroxyalkyl methacrylates, alkoxyalkyl methacrylates, cyanoalkyl methacrylates, N-alkoxymethylacrylamides and N-alkoxymethylmethacrylamides, and from about 2 percent to about 50 percent by weight of 2. a polymer of the group consisting of homopolymers and copolymers of alkyl acrylates, hydroxyalkyl acrylates, alkoxyalkyl acrylates, cyanoalkyl acrylates, alkyl methacrylates, hydroxyalkyl methacrylates, alkoxyalkyl methacrylates, cyanoalkyl methacrylates, acrylamides, methacrylamides, N-alkoxymethylacrylamides, N-(substituted alkyl)acrylamides, N-(substituted alkyl) methacrylamides, alkyl acrylamides, alkyl methacrylamides, and N-alkoxymethylmethacrylamides; and subjecting the substrate and coating to a total dosage of high energy ionizing irradiation from about 2 to about 20 megarads and transferring the film from the release paper whereby a permenently tacky pressure-sensitive adhesive is formed.

2. The method of claim 1 wherein the monomer is 2-ethylhexyl acrylate.

3. The method of claim 1 wherein the polymer is a homopolymer of 2-ethylhexyl acrylate.

4. The method of claim 1 wherein the mixture contains up to about 30 percent of the total weight of monomers of functional monomers selected from the group consisting of dialkyl maleates, dialkyl fumarates, hydroxyalkyl maleates, hydroxyalkyl fumarates, cyanoalkyl meleates, cyanoalkyl fumarates, alkyl hydrogen maleates, alkyl hydrogen fumarates, cyanoalkyl hydrogen maleates, cyanoalkyl hydrogen fumarates, N-t-butylacrylamide, and diacetone acrylamide.

5. The method of forming a pressure-sensitive adhesive coated substrate which comprises a. applying to a substrate a layer of an essentially solventless syrup comprising from about 50 percent to about 98 percent by weight of 1. a monomer selected from the class consisting of alkyl acrylates, hydroxyalkyl acrylates, alkoxyalkyl acrylates, cyanoalkyl acrylates, alkyl methacrylates, hydroxyalkyl methacrylates, alkoxyalkyl methacrylates, cyanoalkyl methacrylates, N-alkoxymethyl acrylamides and N-alkoxymethyl methacrylamides; and from about 2 percent to about 50 percent by weight of 2. a polymer of the group consisting of homopolymers and copolymers of alkyl acrylates, hydroxyalkyl acrylates, alkoxyalkyl acrylates, cyanoalkyl acrylates, alkyl methacrylates, hydroxyalkyl methacrylates, alkoxyalkyl methacrylates, cyanoalkyl methacrylates, acrylamides, methacrylamides, N-alkoxymethyl acrylamides, N-(substituted alkyl) acrylamides, N-(substituted alkyl) methacrylamides, alkyl acrylamides, alkyl methacrylamides, and N-alkoxymethyl methacrylamides; and b. subjecting the substrate and coating to a total dosage of high energy ionizing irradiation of from about 2 to about 20 megarads; whereby a permanently tacky pressure-sensitive adhesive coating is formed on the surface of said substrate.

6. The method of claim 5 wherein the monomer is N-(2-ethylhexoxymethyl)acrylamide.

7. the method of claim 5 wherein the monomer is 2-ethylhexyl acrylate.

8. The method of claim 5 wherein the polymer is a homopolymer selected from the group consisting of N-(2-ethylhexoxymethyl)acrylamide and 2-ethylhexyl acrylate.

9. The method of claim 5 wherein the coating has a film thickness of from about one to about 25 mils.

10. The method of claim 5 wherein the substrate is release paper.

11. The method of claim 5 wherein the mixture of materials comprises up to about 30 percent of the total weight of monomers of functional monomers selected from the group consisting of dialkyl maleates, dialkyl fumarates, hydroxyalkyl maleates, hydroxyalkyl fumarates, cyanoalkyl maleates, cyanoalkyl fumarates, alkyl hydrogen meleates, alkyl hydrogen fumarates, cyanoalkyl hydrogen maleates, cyanoalkyl hydrogen fumarates, N-t-butylacrylamide, and diacetone acrylamide.

12. The method of claim 5 wherein the substrate is a flexible backing material.

* * * * *